(12) United States Patent
Hunter

(10) Patent No.: US 10,602,858 B1
(45) Date of Patent: Mar. 31, 2020

(54) RACK ASSEMBLY FOR STORING AND DISPENSING SPICES

(71) Applicant: Jamila Hunter, Cary, NC (US)

(72) Inventor: Jamila Hunter, Cary, NC (US)

( * ) Notice: Subject to any disclaimer, the term of this patent is extended or adjusted under 35 U.S.C. 154(b) by 0 days.

(21) Appl. No.: 16/121,824

(22) Filed: Sep. 5, 2018

(51) Int. Cl.
| | |
|---|---|
| *A47F 1/035* | (2006.01) |
| *A47J 47/08* | (2006.01) |
| *A47F 1/12* | (2006.01) |
| *A47J 47/04* | (2006.01) |
| *A47J 47/16* | (2006.01) |

(52) U.S. Cl.
CPC .............. *A47F 1/035* (2013.01); *A47F 1/125* (2013.01); *A47J 47/04* (2013.01); *A47J 47/08* (2013.01); *A47J 47/16* (2013.01)

(58) Field of Classification Search
CPC .. A47F 1/125; A47F 1/035; A47F 1/03; A47J 47/04; A47J 47/08; A47J 47/16; G07F 13/00; A47B 81/007; A47B 69/00; A47B 49/00; A47B 87/02; A47B 73/00
USPC ...................................... 222/142.3, 144, 143
See application file for complete search history.

(56) References Cited

U.S. PATENT DOCUMENTS

| | | | |
|---|---|---|---|
| 3,794,952 A * | 2/1974 | Dowis ................... | H01R 39/00 439/21 |
| 7,156,226 B1 | 1/2007 | Van Sickle | |
| 8,292,096 B2 | 10/2012 | Thompson | |
| 8,727,178 B1 * | 5/2014 | Carter .................... | G07F 13/00 194/240 |
| 2003/0230355 A1 * | 12/2003 | Bartholomew ........ | A45D 44/00 141/104 |
| 2010/0089848 A1 * | 4/2010 | Thompson .............. | A47J 47/16 211/77 |
| 2018/0228319 A1 * | 8/2018 | Kanner .................. | A47J 42/44 |

* cited by examiner

*Primary Examiner* — Paul R Durand
*Assistant Examiner* — Robert K Nichols, II
(74) *Attorney, Agent, or Firm* — Sanchelima & Associates, P.A.; Christian Sanchelima; Jesus Sanchelima

(57) ABSTRACT

A rack assembly for storing and dispensing spices is disclosed. The rack assembly comprises a base, a spindle couple to the base, a plurality of rods coupled to the spindle, a plurality of platforms mounted on the spindle, and a plurality of containers. Each container is placed on the platform and coupled to the rod. Each container comprises a wheel provided within. The wheel is coupled to the rod. Each rod is actuated to operate the wheel to dispense spices stored in the container. The rack assembly comprises a control unit communicatively coupled to the plurality of rods. The control unit is used to select an amount of the spice required. After selecting, the control unit instructs the rod to actuate and to operate the wheel to dispense the spice stored in the container.

13 Claims, 5 Drawing Sheets

RACK ASSEMBLY FOR STORING AND DISPENSING SPICES

BACKGROUND OF THE INVENTION

1. Field of the Invention

The present disclosure generally relates to storage containers. More particularly, the present disclosure relates to a rack assembly comprising a plurality of containers for storing and dispensing food items or spices.

2. Description of the Related Art

It is known that spices, minerals, and organic compounds are used in kitchen for flavoring, coloring or preserving food. The spices, minerals, and organic compounds may include, but not limited to, cardamom, clove, salt, sugar, cinnamon, black pepper, cumin, coriander, mustard seeds and so on.

Typically, each of the spices, minerals, and organic compounds is stored in a separate storage container. All the storage containers may be labeled to identify the spice, mineral, or organic compound stored therein. Generally, the storage containers are placed on shelves provided in the kitchen. Placing of the storage containers on the shelves may take up a huge space in the kitchen. Further, improper organization of the storage containers may lead to accumulation of the spices in the kitchen. As a result, the kitchen needs to be cleaned regularly.

In order to overcome the problem of organizing the storage containers, different rack assemblies, shelves, and holders have been proposed in the past. One such example was disclosed in a U.S. Pat. No. 7,156,226. In U.S. Pat. No. 7,156,226, a multi-compartment container for storing food, personal and miscellaneous items, is disclosed. The container comprises a base with a bottom and a circular sidewall. The container comprises a plurality of compartments, each having an access opening to receive medications, spices, dried food products, and so on.

Another example for organizing the storage containers was disclosed in U.S. Pat. No. 8,292,096. In U.S. Pat. No. 8,292,096, a spice rack provided for mini spice containers is disclosed. The rack includes a spindle with a rotatable carriage having multiple rows of container compartments. Each compartment is adapted to hold a single spice container.

Although the above disclosures provide a multi-compartment container or a rack for storing different spices, they have several problems. For instance, if a user wishes to take spices from one container, then the user has to manually have to open the lid of the container and take the spice. Further, the user has to manually measure quantity of the spices based on the requirement. In the process, the user may accidently drop the spices on floor which may leave stains on the floor and that has to be cleaned.

Other documents describing the closest subject matter provide for a number of more or less complicated features that fail to solve the problem in an efficient and economical way. None of these patents suggest the novel features of the present invention. Specifically, none of the disclosures in the art disclose a rack assembly comprising a plurality of containers, each container used to store food or spice and that can be operated without manual intervention to dispense the spices.

Therefore, there is a need in the art for a rack assembly comprising a plurality of containers, each being operable without manual intervention to dispense spices stored in the containers.

SUMMARY OF THE INVENTION

It is one of the main objects of the present invention to provide a rack assembly comprising a plurality of containers; each being operable without manual intervention to dispense spices stored in the containers and avoids the drawbacks of the prior art.

It is one object of the present invention to provide a rack assembly provided in a carousel style spice racks for storing different type of spices. The rack assembly comprises a plurality of containers. Each container being operable separately to dispense the spices in a desired quantity without user intervention.

It is one object of the present invention to provide a rack assembly for storing spices. The rack assembly comprises a base, a spindle couple to the base, a plurality of rods coupled to the spindle, a plurality of platforms mounted on the spindle, and a plurality of containers, each container being placed on the platform and coupled to the rod. Each container comprises a wheel provided within. The wheel is coupled to the rod. Each rod is actuated to operate the wheel to dispense spices stored in the container.

It is another object of the present invention to provide the rack assembly comprising at least one control unit communicatively coupled to the plurality of containers. The at least one control unit is used to select an amount of the spice required and to actuate the rod to operate the wheel to dispense spices stored in the container.

It is another object of the present invention to provide instructions remotely to the control unit to select the container, an amount of the spice to be dispensed. The control unit is operated to actuate the rod and to operate the wheel to dispense spices stored in the container.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a rack assembly for storing and dispensing spices. The rack assembly comprises a base, a spindle couple to the base, a plurality of rods coupled to the spindle, a plurality of platforms mounted on the spindle, and a plurality of containers. Each container is placed on the platform and coupled to the rod. Each container comprises a wheel provided within. The wheel is coupled to the rod. Each rod is actuated to operate the wheel to dispense spices stored in the container. In one example, the rack assembly comprises a control unit operably coupled to the plurality of rods. The control unit is used to select an amount of the spice required. After selecting, the control unit instructs the rod to actuate and to operate the wheel to dispense spice stored in the container.

In another example, each container is provided with a control unit. The control unit is used to select an amount of the spice required. Subsequently, the control unit instructs the rod to actuate the rod in order to operate the wheel to dispense spice from the container.

Various features and embodiments of a rack assembly are explained in conjunction with the description of FIGS. 1-7.

Figure 1:
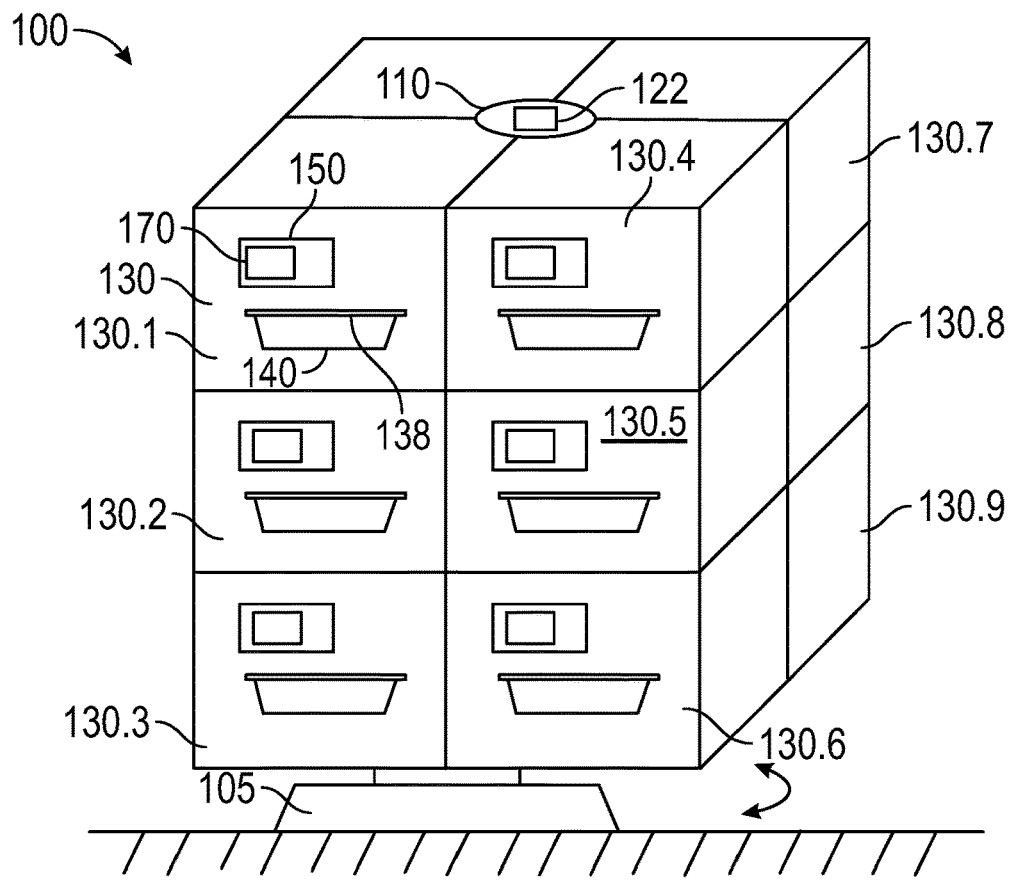
FIG. 1 illustrates a perspective view of a rack assembly 100, in accordance with one embodiment of the present disclosure.

Referring to FIG. 1, a perspective view of a rack assembly 100 is shown, in accordance with one embodiment of the present disclosure. The rack assembly 100 comprises a base 105, a spindle 110. The spindle 110 is rotatably mounted on the base 105. The spindle 110 is coupled to the base 105 using known mechanisms. The spindle 110 may be provided in a cylindrical shape as shown in FIG. 2.

Figure 2:
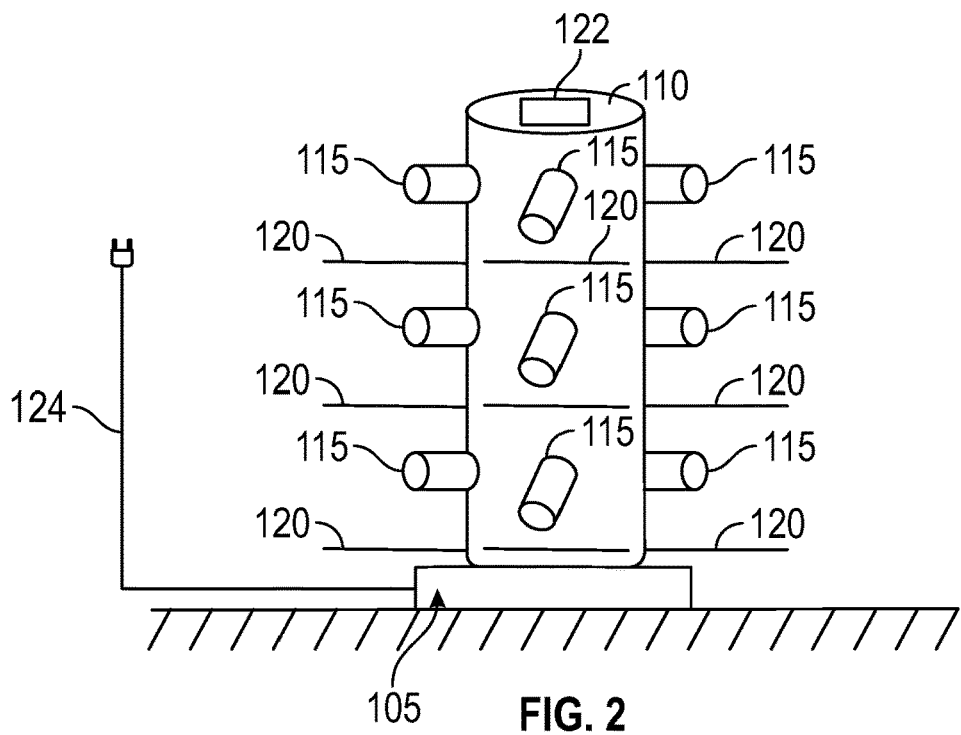
FIG. 2 illustrates a base 105 coupled to a spindle 110, in accordance with one embodiment of the present disclosure.

Referring to FIG. 2, the spindle 110 comprising a plurality of rods 115 is shown, in accordance with one embodiment of the present disclosure. The plurality of rods 115 is coupled to the spindle 110 using known mechanisms such as welding, fastening and so on. In one example, the plurality of rods 115 is provided in tubular or cylindrical structures. Although the current implementation is explained considering that the plurality of rods 115 is provided in tubular or cylindrical structures, it should be understood that the plurality of rods 115 might be provided in a square, rectangular or any other shape. As can be seen, each of the plurality of rods 115 extends outwardly from the surface of the spindle 110. The plurality of rods 115 is placed at same horizontal plane in a plurality of rows. Preferably, the plurality of rods 115 is placed at equal distance. The spindle 110 may be provided with a predefined number of the plurality of rods 115, such as two or more in each row in the horizontal plane. As specified above, the plurality of rods 115 may be placed at equal distance or at varied distance.

Further, the spindle 110 comprises a plurality of platforms 120, as shown in FIG. 2. The plurality of platforms 120 may indicate a flat structure or flat plate made up of plastic, metal or any other suitable material. In one implementation, each of the plurality of platforms 120 may comprises a charging plate (not shown) used to charge a container placed at the platform 120. In one example, the spindle 110 may be provided with a display unit 122 at the top as shown in FIG. 2. The display unit 122 may rotate along with rotation of the spindle 110 or may be configured to rotate on its own.

Referring to FIG. 1, the rack assembly 100 comprises a plurality of containers such as a first container 130.1, a second container 130.2, a third container 130.3, a fourth container 130.4, a fifth container 130.5, a sixth container 130.6, a seventh container 130.7, a eighth container, a ninth container 130.9, a tenth container 130.10 and so on, collectively termed as containers 130.

In one example, the display unit 122 may be used to input name of container 130 and name of the spice stored in each of the containers 130. Further, amount of the spice stored in each container 130 may be inputted with the help of the display unit 122. In order to input name, amount of spice, a user may navigate the options provided in the display unit 122 and enter the information.

In one example, the rack assembly 100 may be provided with a cable or power cord 124 couple to the base 105. The cable 124 may be coupled to a power source (not shown) to rotate the base 105 or the spindle 110.

Figure 3A:
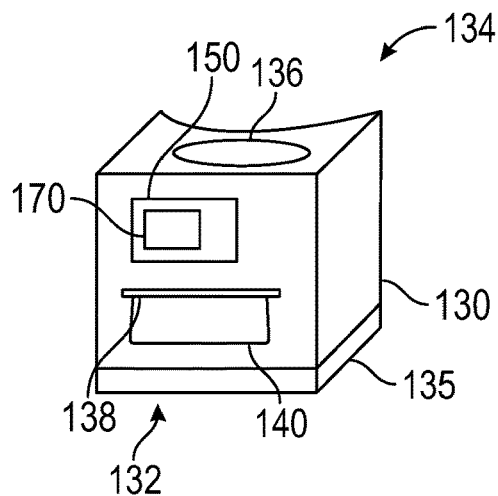
FIGS. 3A, 3B and 3C illustrate a container 130, in accordance with one embodiment of the present disclosure.
Figure 3B:
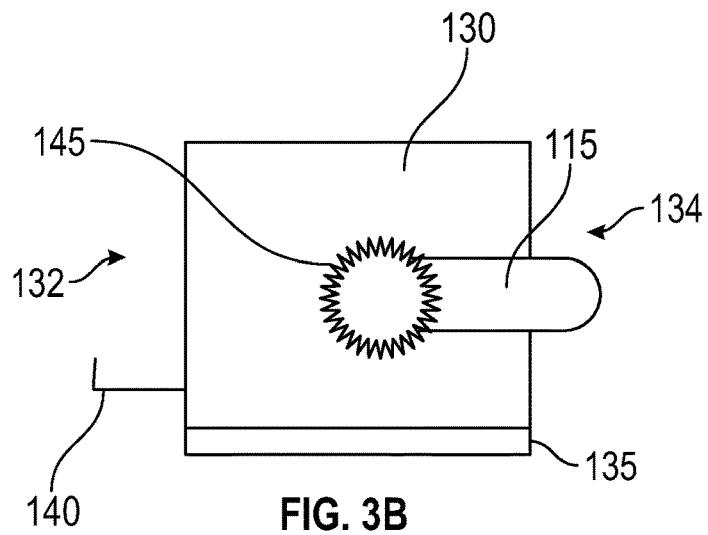
Figure 3C:
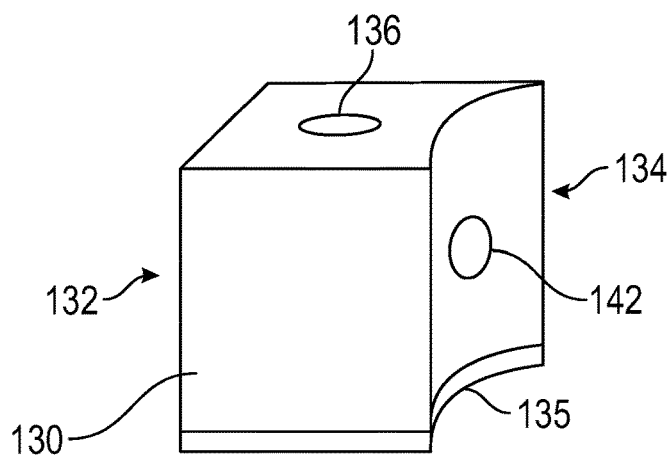
Figure 4:
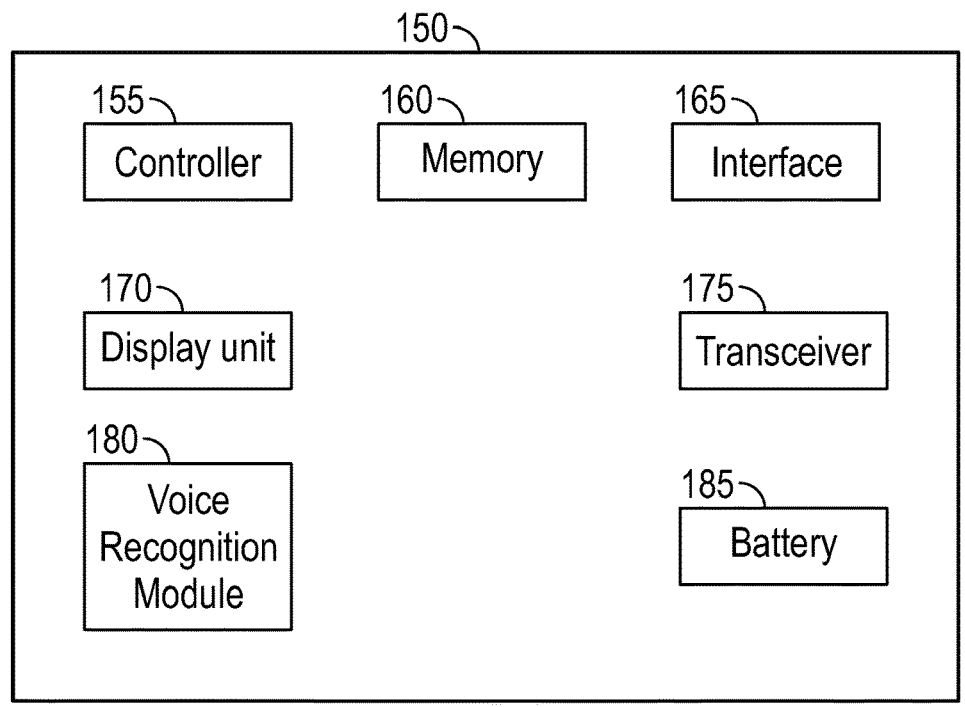
FIG. 4 illustrates a control unit 150, in accordance with one exemplary embodiment of the present disclosure.

Referring to FIGS. 3A, 3B and 3C, the container 130 is explained. Specifically, FIG. 3A shows a perspective view of the container 130. The container 130 may be provided in a square or rectangular shape. The container 130 may be made up of plastic, metal or any other suitable material. Each of the containers 130 comprises a bottom (not shown), upstanding sidewalls (not shown). The bottom and the sidewalls define an interior (not shown) and open top.

The container 130 comprises a front end 132 and a rear end 134. Further, the container 130 may comprises a container base 135. The container base 135 may be used to change the container 130. Further, the container base 135 may be used to charge the container 130 when the container 130 is not in use. In one example, the container 130 comprises a cavity 136 at the top. The cavity 136 may be used to fill spice in the container 130. Further, a user of the rack assembly 100 may insert hand to manually shake or mix the spice stored in the container 130. At the front end, the container 130 further comprises an opening 138 indicating a groove to provide access to the interior of the container 130. FIG. 3B shows a side view of the container 130. The container 130 comprises a cup 140 provided at the front end 132. The cup 140 may be removably coupled to the container 130. In one example, the cup 140 may be coupled to the container 130 using a fastener or any other known mechanisms.

Now referring to FIG. 3C, a rear perspective view of the container 130 is shown, in accordance with one embodiment of the present disclosed. As can be see, the rear end 134 of the container 130 is provided in a curvature e.g., in semi-circular shape to accommodate the shape of the spindle 110. In other words, the curvature is provided in align the container 130 with the curvature of the spindle 110. Further, the container 130 comprises a groove 142 provided at the rear end 134. The groove 142 is provided to receive the rod 115 inside the container 130 as shown in FIG. 3B. Further, the container 130 comprises a wheel 145 provided at inner surface of the container 130. The wheel 145 is coupled to the rod 115 using known mechanisms.

Each of the containers 130 may be used to store food items or spices. The food items and spices may include, but not limited to, salt, pepper, oregano, nutmeg, thyme, cinnamon and so on. For example, the first container 130.1 may be used to store salt. The second container 130.2 may be used to store pepper. The third container 130.3 may be used to store oregano. Similarly, all of the containers 130 are used to store different spices.

In order to put the spices in the containers 130, each of the containers 130 is removed from the rack assembly 100 shown in FIG. 1. After removing, the spice is put in the container 130 through the interior i.e., open top of the container 130. Subsequently, the containers 130 are coupled to the spindle 110.

In order to couple the container 130, at first, the container 130 is placed on the platform 120. Further, the rod 115 coupled to the wheel 145 is drawn through the groove 142 provided in the container 130.

Referring to FIG. 1, each of the containers 130 comprises a control unit 150. Now, referring to FIGS. 1 and 4, the control unit 150 is explained. The control unit 150 comprises a controller 155, a memory 160, an interface 165, a second display unit 170, a transceiver 175, a voice recognition module 180, and a battery 185.

The controller 155 may be implemented as one or more microprocessors, microcontroller, microcomputers, digital signal processors, central processing units, state machines, logic circuitries, and/or any devices that manipulate signals based on operational instructions. Among other capabilities, the controller 155 is configured to fetch and execute computer-readable instructions or program instructions stored in the memory 160.

The memory 160 may include any computer-readable medium known in the art including, for example, volatile memory, and/or non-volatile memory, such as read only memory (ROM), erasable programmable ROM, flash memories, hard disks, and so on.

The interface 165 may include a variety of software and hardware interfaces, for example, a web interface, a graphical user interface, and the like. The interface 165 may allow the control unit 165 to interact with the user or customer directly or through other devices (not shown). In one example, the interface 165 may include a touch screen interface.

The second display unit 170 may include a Light Emitting Diode (LED) or Liquid Crystal Display (LCD) screen configured to display text or video. In the current implementation, the second display unit 170 may include a display screen that is responsive to touch of a user. The second display unit 170 may be configured to display a type or name of the spice stored in the container 130. Further, the second display unit 170 may comprise button either physical or touch interface buttons, which the user can use to navigate the options provided to select an amount of spice to be dispensed from the container 130.

The transceiver 175 is used to transmit and receive signal/data from the controller 155 to external devices such as servers, electronic devices or other devices.

The voice recognition module 180 indicates a sensor to detect or recognize voice or sound. The voice recognition module 180 is capable of recognizing voice of users, covert the signals. Further, the voice recognition module 180 sends the signals to the controller 155.

The battery 185 may include but not limited to a rechargeable battery made up of Lithium Ion to power the control unit 150.

Figure 5:
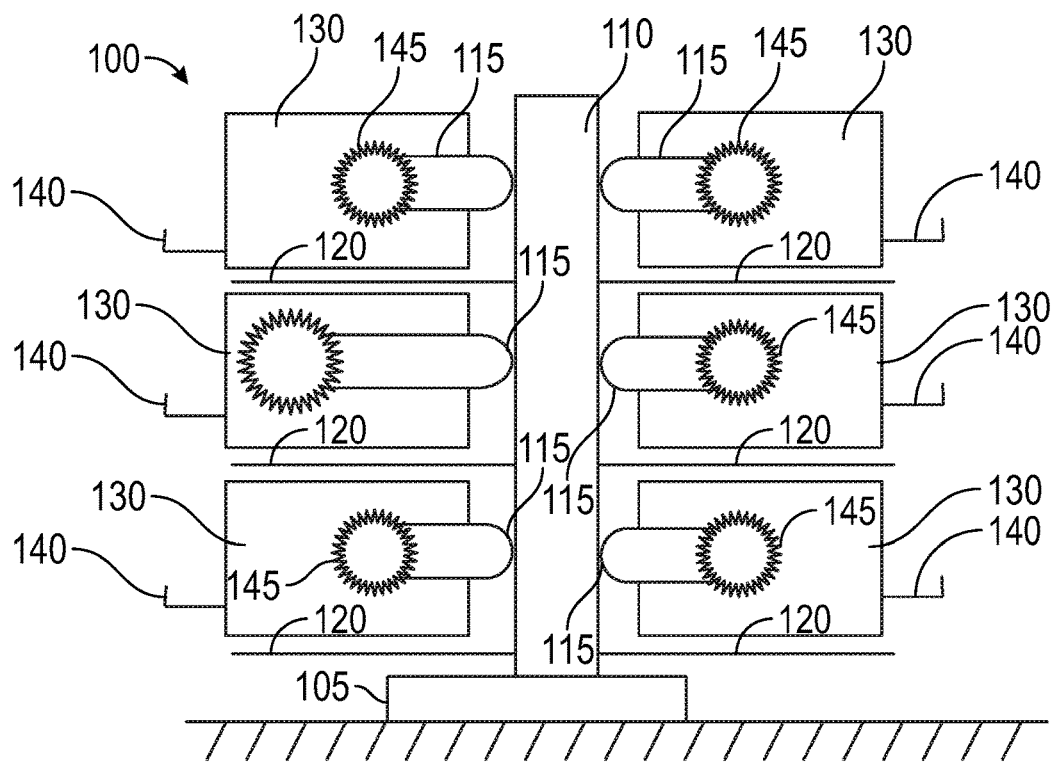
FIG. 5 illustrates a side view of the rack assembly 100, in accordance with one exemplary embodiment of the present disclosure.

Now, referring to FIG. 5, a side view of the rack assembly 100 in which the wheel 145 is provided within the container 130 is shown, in accordance with one embodiment of the present disclosure. As explained above, wheel 145 in each container 130 is coupled to the rod 115.

Now, FIG. 5 is used to explain operation of the rack assembly 100. Consider that a user of the rack assembly 100 wishes to take spice stored in the container 130 (130.2). At first, the user of the rack assembly 100 may rotate the rack assembly 100 with the help of the spindle 110 such that the container 130.2 is made to face him. Subsequently, the user may use the control unit 150 provided at the container 130.2. Specifically, the user may navigate the options provided on the interface 165 at the second display unit 170. The user may select an option to dispense a certain quantity of the spice stored in the container 130.2. For example, consider that the user selected to dispense a predefined amount or desired amount of pepper stored in the container 130.2. After receiving the selection of the quantity or amount of spice to be dispensed, the controller 155 instructs the rod 115 inserted into the container 130.2 to actuate. Upon actuation, the rod 115 extends thereby operating or rotating the wheel 145. The wheel 145 rotates and comes in contact with the spice stored in the container 130.2. When the wheel 145 rotates and being pushed by the rod 115, the wheel 145 pushes the spice out of the container 130.2 through the opening 138 provided at the front end 132. Subsequently, the spice i.e., pepper is collected at the cup 140 provided at the front end 132. The user may remove the cup 140 and take the pepper. It should be understood that the wheel 145 is configured in such a way that one rotation pushes a certain amount of spice when the wheel 145 comes in contact with the spice.

After dispensing the spice in the cup 140, the rod 115 is retrieved to its original position. Similarly, the user may operate the control unit 150 provided at each container 130 to dispense a desired amount of the spice in the cup 140 placed at the front end 132 of the container 130.

In order to refill the spice in the container 130, the user may remove the container 130 from the platform 120, place or add the spice and put back the container 130 on the platform 120 and insert the rod 115 through the groove 142 to coupled the rod 115 to the wheel 145.

Figure 6:
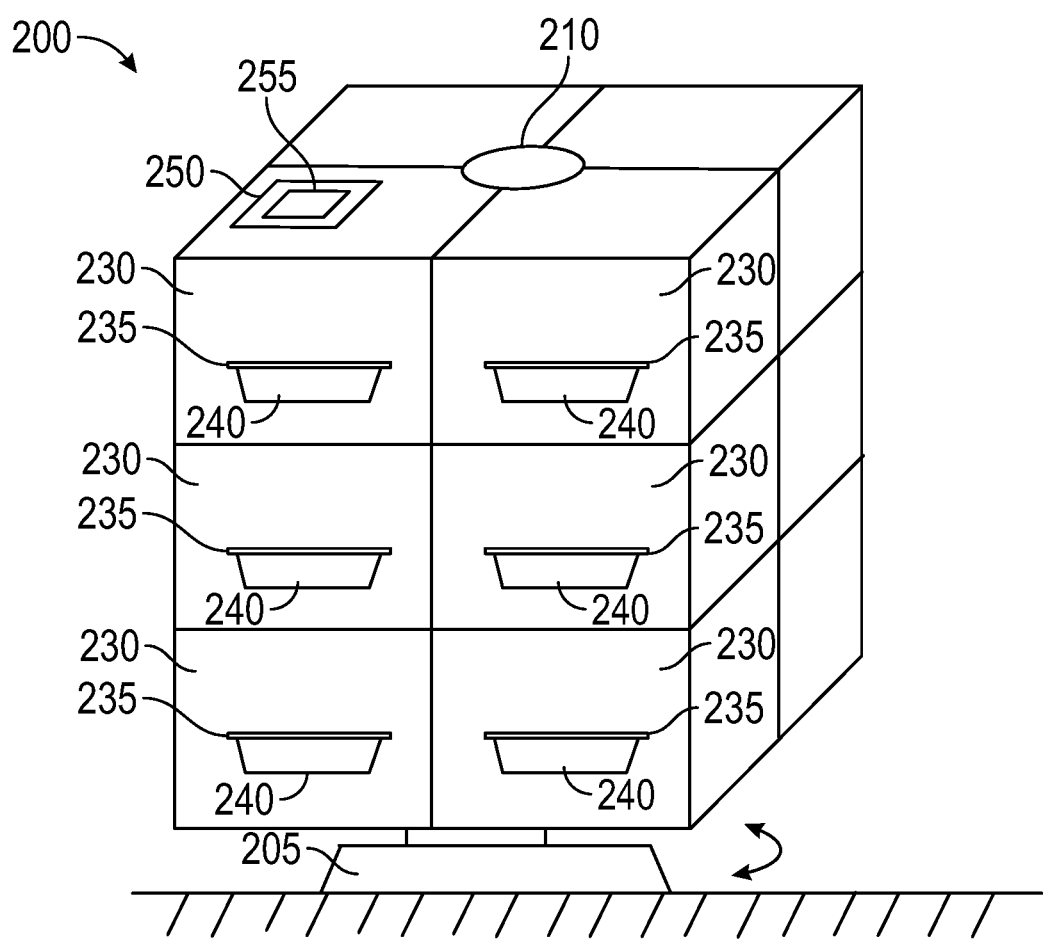
FIG. 6 illustrates a perspective view of a rack assembly 200, in accordance with one exemplary embodiment of the present disclosure.

Now, referring to FIG. 6, a rack assembly 200 comprising a control unit 250 at the top is shown, in accordance with another embodiment of the present disclosure. The rack assembly 200 comprises a base 205, a spindle 210. The spindle 210 comprises a plurality of rods (not shown, similar to rods 115 shown in FIG. 2). Further, the spindle comprises a plurality of platforms (not shown, similar to platforms 120 shown in FIG. 2).

The rack assembly 200 further comprises a plurality of containers 230. Each of the containers 230 comprises an opening 235 and a cup 240 at a front end (not shown). The cup 240 may be removably coupled to the container 230. The container 230 comprises a wheel (not shown, similar to wheel 145 in FIG. 5).

The rack assembly 200 further comprises a control unit 250 at the top of the rack assembly 200. The control unit 250 may comprises a display unit 255. The control unit 250 is similar to the control unit 150 explained above. The control unit 250 comprises a processor (not shown), a memory (not shown), an interface (not shown), the display unit 255, a transceiver (not shown), a voice recognition module (not shown), and a battery (not shown).

The current embodiment is presented to illustrate that a single control unit 250 is provided to dispense spice from any of the container 230. In the current embodiment, the control unit 250 is operably coupled to the rods. The control unit 250 stores information corresponding to each of the containers 230. Specifically, the control unit 250 stores the information such as type of spice and name of container, amount of spice present in the container and so on in the memory.

In order to receive or take the spice from any container 230, the user may operate the control unit 250. The user may navigate the options provided on the interface and select the name or number of the container 230 or type of spice he wishes to receive. As specified above, the information corresponding to each of the container 230 is stored in the memory. Based on the selection made by the user, the control unit 250 operates the rod correspondingly. For example, consider that the user selects salt to be dispensed. Based on the selection, the control unit 250 operates the rod coupled to the container 230 storing the salt. Subsequently, the rod moves forward and causes the wheel to dispense the salt though the opening 238 into the cup 240 provided at the container 230.

In another implementation, the instructions may be received using voice commands provided by the user. In order to receive the voice commands from the user, the control unit 250 may employ the voice recognition module. For the above example, the user may say words e.g., "dispense 50 grams of salt". Based on the voice commands, the control unit 250 processes the signals and operates the rod coupled to the container 230 storing the salt. Subsequently, the rod moves forward and causes the wheel to dispense the salt though the opening 235 into the cup 240 provided at the container 230.

In yet another embodiment, the control unit 250 may be communicatively coupled to an electronic device such as a mobile phone, a laptop, voice recognition devices to provide instructions to the control unit 250. The electronic device may be coupled to the control unit 250 using a wired or wireless network that is known in the art. For example, the electronic device may be coupled to the control unit 250 using Wi-Fi or Bluetooth and so on. The user may use the electronic device to provide instructions to the control unit 250. Based on the instructions received, the control unit 250 processes the instructions and operates the corresponding rod to dispense the spice in desired quantity.

Figure 7:
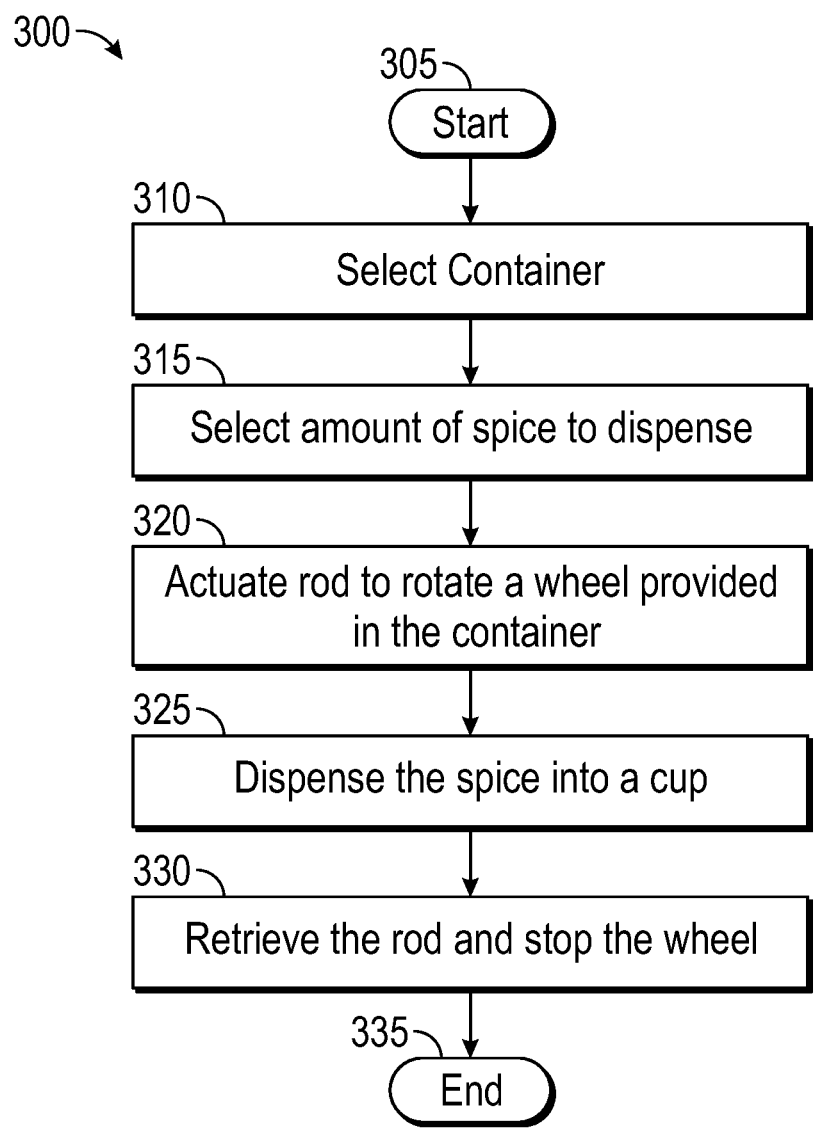
FIG. 7 illustrate a method 300 of dispensing spices, in accordance with one embodiment of the present disclosure.

Referring to FIG. 7, a method 300 of dispensing spices stored in a rack assembly 100 or 200 is shown, in accordance with an embodiment of the present disclosure. The method 300 may be described in a sequence of steps to be performed for dispensing spices. However, the order in which the method 300 is described and is not intended to be construed as a limitation, and any number of the described method blocks can be combined in any order to implement the method 600 or alternate methods. Additionally, individual blocks may be deleted from the method 300 without departing from scope of the disclosure described herein. For ease of explanation, in the embodiments described below, the method 300 may be implemented in the above-described rack assembly 100 or 200.

At step 305, the method 300 starts.

At step 310, a user selects the container, which is storing the spice he wishes to receive. The user selects the container using the control unit (via the display unit).

At step 315, the user may select the amount of the spice to be dispensed from the container.

At step 320, the control unit instructs the rod to actuate and to rotate the wheel provided in the container that is storing the spice he desired to receive.

At step 325, the wheel dispenses the spice into the cup provided in front of the container.

At step 330, the rod is retrieved to its original position and the wheel is stopped.

At step 335, the method ends.

It is evident from the above description that the rack assembly can be used to store different spices in different container and the spices can be dispensed in desired quantities by operating the rod, and the wheel provided in the container. As the cup is provided at front end of the container, the spice dispensed into the cup will not be spilled. As a result, the floor or table in which the rack assembly is placed can be kept clean at all times.

Further, the user may remove the container and refill the spice and put back the container on the platform in order to use the container to dispense desired quantity of the spice.

The control unit may be provided at each container, which will help to operate each container separately. In another example, a single control unit may be provided to operate all the containers provided in the rack assembly. The control unit may be operated using the interface provided at the display unit or by using the voice recognition module or with the help of the electronic device.

It should be obvious to a person skilled in the art to provide the base, the spindle, the rod, the container in plastic or any other suitable material. Further, the rack assembly may be made in suitable size dependent on the number of containers required and size of the containers.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A rack assembly for storing and dispensing spices, the rack assembly comprising:

a base;

a spindle coupled to a top end of the base, wherein said spindle has a uniform cylindrical shape having a diameter that is smaller than the diameter of said base, wherein the height of said spindle is significantly greater than the height of said base, wherein said spindle includes a first portion a second portion, and a third portion;

a plurality of rods coupled to the spindle, wherein four rods are equidistantly mounted along an outer surface area of said first portion, said second portion, and said third portion, wherein said plurality of rods are mounted perpendicularly to said spindle;

a plurality of platforms mounted on the spindle, each platform being a flat structure in a horizontal position protruding a predetermined amount from said spindle, wherein said first portion, said second portion, and said third portion each include four platforms, wherein each platform is mounted underneath a rod of said plurality of rods;

a plurality of containers, each container being in the shape of a cube and having a cut portion on a side of said cube, wherein said cut portion is a C-shaped cut portion extending inwardly within said cube, wherein said cut portion extends entirely along a length and height of said side, wherein four containers are mounted to said first portion, said second portion, and said third portion, wherein said cut portion of each container includes a groove located on the center of said cut portion, where said groove is a circular opening having a diameter larger than said plurality of rods extending a predetermined amount within each container, wherein said groove receives a rod of said plurality of rods to securely mount each container to each rod, wherein the C-shaped cut portion cooperates with a quarter of an outer surface area of said first portion, said second portion, and said third portion, wherein four containers are removably mounted to each rod of said first portion to form a cubic rectangle, wherein four containers are removably mounted to each rod of said second portion to from a cubic rectangle, wherein four containers are removeably mounted to each rod of said third portion to form a cubic rectangle, wherein said plurality of containers mounted on said spindle collectively form a large cubic rectangle, wherein each container is configured to automatically dispense spices, wherein each container is refillable, wherein each container is removable form said spindle and configured to be used as an independent spice shaker; and a wheel coupled to the rod, wherein the wheel is provided within each container, wherein the rod is actuated to operate the wheel to dispense spices stored in a container.

2. The rack assembly of claim 1, wherein each container comprises a cup placed at a bottom of each container at an outer side to receive the spice dispensed.

3. The rack assembly of claim 1, wherein each container comprises an opening in axis with a cup to dispense the spice.

4. The rack assembly of claim 1, wherein each container comprises a control unit, including a display mounted on a front end of said plurality of containers, wherein said control unit is programmable by a user.

5. The rack assembly of claim 4, wherein the control unit is communicatively coupled to the rod to control the actuation of the rod in each container.

6. The rack assembly of claim 5, wherein the control unit comprises a display to provide instructions to select an amount of spice to be dispensed by the wheel, wherein said display provides a user with the type of spice stored within a container and to select an amount of spice to be dispensed.

7. The rack assembly of claim 1, wherein the rack assembly comprises a control unit.

8. The rack assembly of claim 7, wherein the control unit is communicatively coupled to the plurality of rods.

9. The rack assembly of claim 8, wherein the control unit comprises an interface to select a container and an amount of spice to be dispensed by the wheel.

10. The rack assembly of claim 7, further comprises a voice recognition module to receive voice commands from a user.

11. The rack assembly of claim 10, wherein the control unit receives the voice commands to actuate the rod to operate the wheel to dispense the spice.

12. The rack assembly of claim 1, wherein the spindle is rotatably mounted on a vertical axis on the base.

13. The rack assembly of claim 1, wherein the each of the plurality of platforms comprises a charging plate used to charge each container.

\* \* \* \* \*